Figure 8:
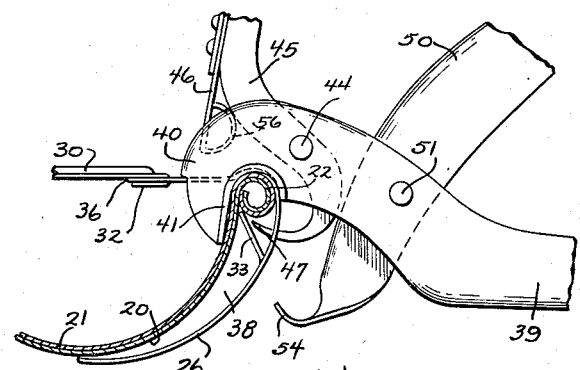

Aug. 28, 1956  M. W. GIBBONS ET AL  2,760,211
TOOL FOR PIERCING EAVES TROUGH SECTIONS
AND APPLYING CLAMP THERETO
Original Filed April 30, 1952  2 Sheets-Sheet 1
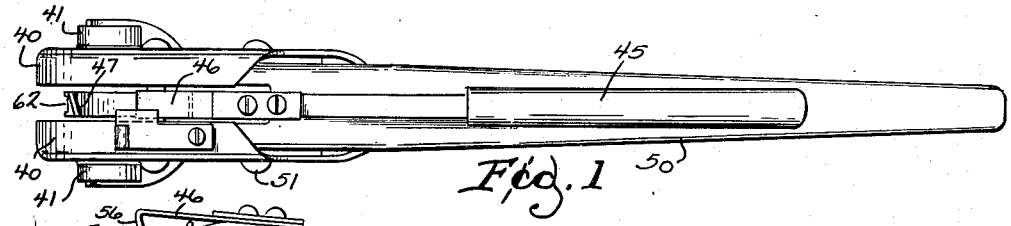
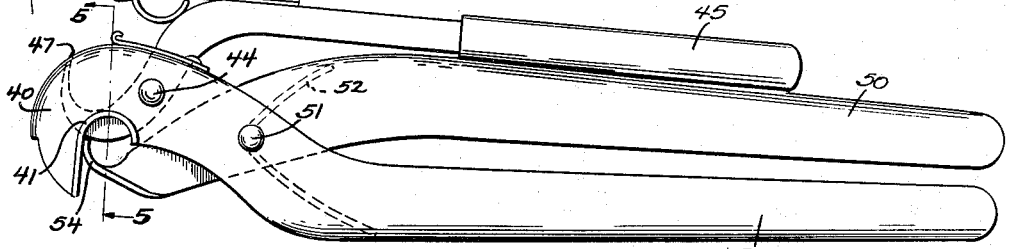
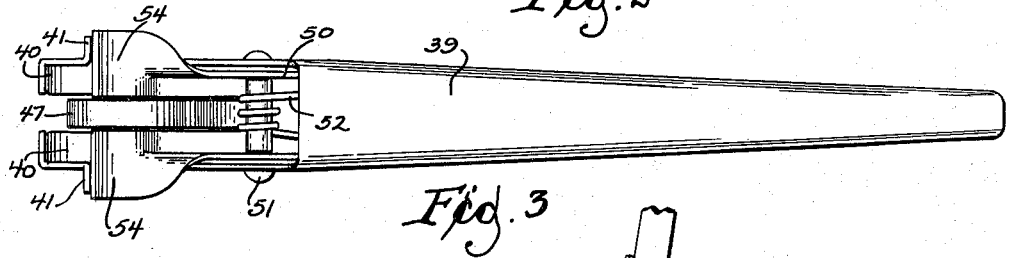
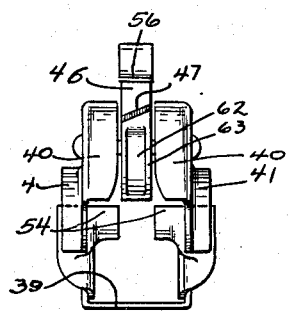
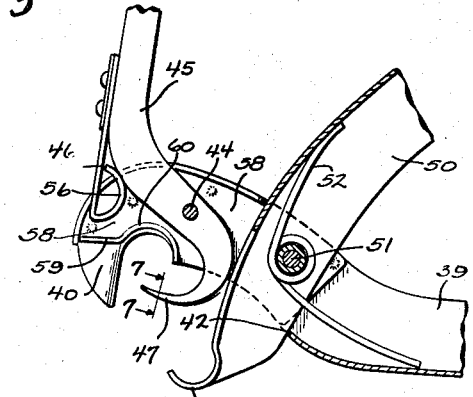
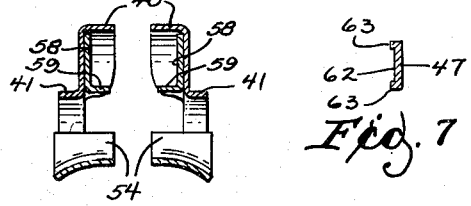
INVENTORS
MELVIN W. GIBBONS
BY WAYNE J. GIBBONS
Wheeler, Wheeler + Wheeler
ATTORNEYS Aug. 28, 1956

M. W. GIBBONS ET AL 2,760,211

TOOL FOR PIERCING EAVES TROUGH SECTIONS
AND APPLYING CLAMP THERETO

Original Filed April 30, 1952

2 Sheets-Sheet 2

INVENTORS
MELVIN W. GIBBONS
WAYNE J. GIBBONS
BY

Wheeler, Wheeler & Wheeler
ATTORNEYS

United States Patent Office 2,760,211
Patented Aug. 28, 1956

2,760,211

TOOL FOR PIERCING EAVES TROUGH SECTIONS AND APPLYING CLAMP THERETO

Melvin W. Gibbons and Wayne J. Gibbons, Brandon, Wis., assignors of one-third to James A. Burke, Brandon, Wis.

Original application April 30, 1952, Serial No. 285,236. Divided and this application September 28, 1953, Serial No. 382,688

3 Claims. (Cl. 7—5.4)

This invention relates to a tool which is specifically designed for the connection of eaves trough sections. The present application is a division of our application Serial No. 285,236, filed April 30, 1952, and entitled A Method of Clamping Eaves Trough Sections and a Clamp and Tool for Connecting Such Sections.

The clamp referred to in our patent application encircles lapping eaves trough sections and has portions which encircle the telescopically associated beads of the eaves trough sections, and a tongue which is passed through the eaves trough sections behind the beads as a means of anchoring the clamp.

The tool to which the present application pertains is provided with multiple jaws and handles for the operation thereof, the several jaws being organized to shape the clamping strap to fit about the eaves trough beads, perforate the eaves trough sections while clamped, project a tongue through the perforation and thereafter offset the tongue while holding the strap in clamping engagement with the eaves trough sections.

Figure 9:
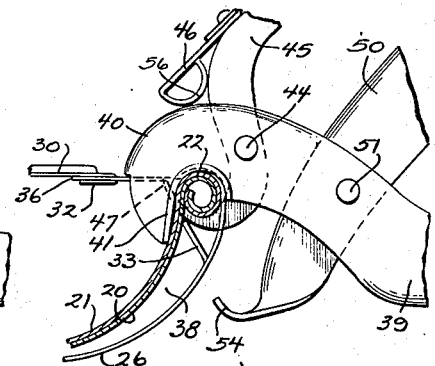
Figure 10:
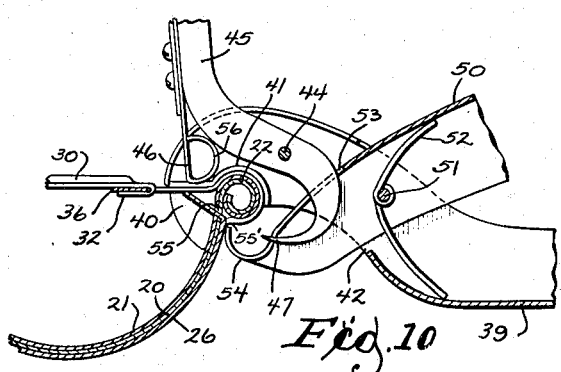
Figure 11:
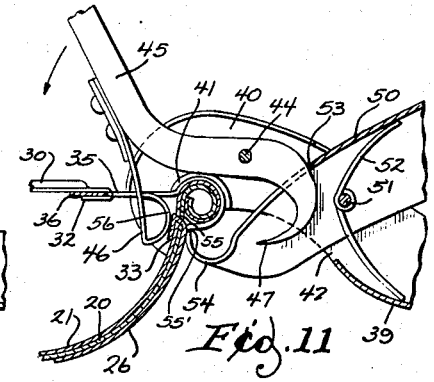
Figure 12:
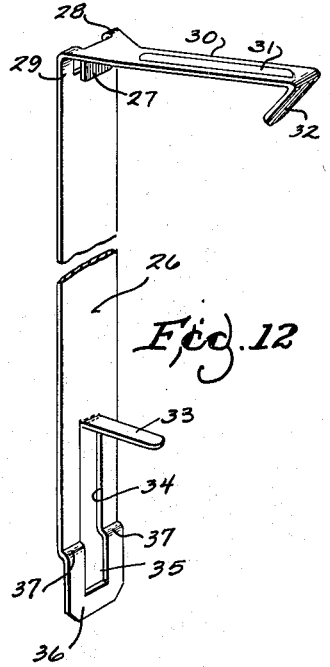
Figure 13:
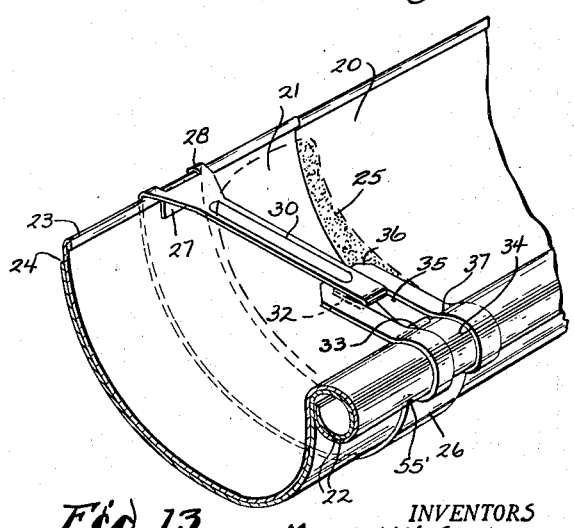

In the drawings:

Fig. 1 is a plan view of the tool.
Fig. 2 is a side elevational view of the tool.
Fig. 3 is a bottom plan view of the tool.
Fig. 4 is a front elevational view of the tool.
Fig. 5 is a view taken in section on the line 5—5 of Fig. 2.
Fig. 6 is a fragmentary detail view taken in longitudinal section through the operating end portion of the tool, showing the several jaws separated.
Fig. 7 is a view taken on the line 7—7 of Fig. 6.
Fig. 8 is an enlarged fragmentary detail view taken in section through the beaded front marginal portions of lapping eaves trough sections with a clamping strap preliminarily applied thereto, the tool being shown in side elevation in a position of application to the work.
Fig. 9 is a view similar to Fig. 8 showing the tool parts in their next successive position of use.
Fig. 10 is a view similar to Fig. 8 showing the tool parts in a position of use subsequent to that illustrated in Fig. 9.
Fig. 11 is a view similar to Figs. 8–10 showing the next successive step in the use of the tool.
Fig. 12 is a view in perspective of the clamp of the type upon which the tool operates.
Fig. 13 is a view in perspective showing the eaves trough joint completed with the use of the tool to apply the clamping strap shown in Fig. 12.

Desirably, the eaves trough sections 20 and 21 are not merely lapped but have their rolled forward margins 22 telescoped together, as clearly shown in Figs. 8 to 11. The rear margins 23, which are beaded, but not rolled, may be lapped and, to reduce the thickness engaged by the strap as hereinafter described, a portion of the lower section 20 may be cut away at 24, this being optional. In placing the sections together, any substantial degree of lap is permissible. Adjacent the end of section 21, which is uppermost, a bed of adhesive, such as roofing cement, or asphalt, is desirably applied at 25 to the lower section 20. It is very advantageous that no accurate cutting of the sections is necessary, as this eliminates a great deal of measuring and fitting. The eliminated operations have heretofore required a number of trips between the ground and the situs of the work. The clamp comprises a strap 26 formed at 27 with a bead engaging hook cut from an intermediate portion of the strap. The hook is formed adjacent a right angle bend 28 in the side portions of the strap at opposite sides of the aperture from which the hook 27 was cut. This clearly appears in Fig. 12. The spacing of the hook 27 from the side portions 29 of the strap is just sufficient to accommodate the thickness of the lapping portions of the trough sections, as clearly appears in Fig. 13.

Beyond the hook 27, the generally horizontal portion 30 of the strap may be longitudinally slotted with margins upwardly formed at 31 for reenforcement. At the extreme end of strap portion 30 is another hook at 32.

The portion of strap 26 below the first mentioned hook 27 normally hangs vertically downwardly from the rear margins of the trough sections when hook 27 is engaged therewith. At a distance from hook 27 which is accurately determined with reference to the size of the trough sections to be clamped, there is a tongue 33 integrally cut from the strap 26, leaving a slot 34 therein. The slot is desirably longer than the tongue, as it receives the tool hereinafter to be described and also receives at its end portion 35 the hook 32 above described. The extreme end portion 36 of the strap is slightly offset at 37 from the plane of the rest of the strap, this being of assistance in positioning it over the rolled edges 22 of the eaves trough sections.

With the strap tongue 27 engaged with the rear beaded edges of the lapping sections 20 and 21, the second step in the clamping operation involves bending the strap around the eaves trough section. This will bring the tongue 33 into the angle beneath the telescoped beads 22 of the lapping trough sections.

The next step in the clamping operation is to bend the terminal end portion 36 of strap 26 over the rolled edges 22. The hook 32 is then passed through the slotted portion 35 and upset therebeneath, as shown in Fig. 8. At this point, the offset 37 is not tightly drawn against the rolled edge 22, and there is considerable slack at 38 beneath tongue 33 and between the strap 26 and the eaves trough sections.

At this point, we desirably commence the use of the special tool which we have devised to facilitate the final clamping operation. One channel shaped handle 39 of the tool is bifurcated to provide laterally spaced jaw portions 40 which are outwardly flanged at 41 to constitute saddles which fit over the beads 22. As shown in the sectional views, the handle 39 is a channel and bifurcation is achieved by simply cutting away its central web at 42. See Figs. 3, 4 and 6.

Pivoted to jaw 40 upon pintle 44 is another handle 45 from which projects a forming tool 46. The handle 45 extends beyond the pintle 44 and is tapered and curved to constitute a piercing tool 47 which, as shown in Fig. 8, lies immediately beneath the telescoped beads 22 of the trough section. In this position of the parts, the handle 45 is nearly vertical and substantially at right angles to the handle 39. The next step in the forming operation is to oscillate handle 45 clockwise, as viewed in Fig. 9, to force the piercing tool 47 through the walls of the lapping troughs immediately beneath their beads 22 and immediately above the strap tongue 33. The jaw 40 remains with its saddle portion bearing on the top of the beads to support the tool during this operation.

Handle 45 is then oscillated counterclockwise to the position of Fig. 10, thereby retracting the piercing tool 47 from the work. The operator then manipulates another handle 50 of the tool, which handle has heretofore been inactive. This handle is pivoted at 51 to the jaws 40 and is normally held in a raised position with respect to handle 39 by means of spring 52 which encircles pintle 51, as shown in Figs. 10 and 11.

The handle 50 comprises an inverted channel, the web of which is cut away at 53 to provide clearance for the movement of the piercing tool 47. The handle 50 is thus bifurcated at its free end and formed to provide laterally spaced upwardly curving jaws at 54. In the operation shown in Fig. 10, these jaws have engaged the portions of strap 26 at opposite sides of tongue 33 and have forced the strap upwardly into the angle beneath the beads 22, thereby forcing the tongue 33 to enter the aperture 55 punched in the eaves trough sections by the piercing tool 47. With the saddle flanges 41 securely resting on top of the rolled edges 22, a powerful clamping effect can be exerted by the opposing jaws 54 to mold the strap securely and snugly to the contours of the trough section and the rolled edges thereof. The offset 37, originally provided in the strap at opposite sides of its aperture 35, is now snugly fitted to the inner surfaces of the rolled edges 22, as shown in Fig. 10, and the end of the strap 36 is drawn tight within the reversely bent hook 32.

The operator will retain his clamping manual pressure upon handles 39 and 50 to hold the strap snugly to the trough sections, as above described, and with his other hand, the operator will now oscillate handle lever 45 counterclockwise as shown by the arrow in Fig. 11. The forming tool 46, which is riveted to the handle and constitutes a forward extension thereof, now moves through the slot 34 of the strap into engagement with tongue 33 and forces the tongue sharply downwardly in contact with the inner surface of the inner eaves trough section 20 to complete the clamping operation, as shown in Fig. 11 and Fig. 13. The clamping pressure exerted by the normally opened jaws 40 and 54 is then relaxed and the handles 39 and 50 are urged apart by the spring 52 to release the completed work. The angle formed in the clamping strap 26 at 55' by the jaws 54 is securely anchored beneath the rolled edges 22 by the upset hook 33. The resulting joint is permanent and leak proof.

As a simple means of making the forming tool 46 which upsets tongue 33, I may use a strip of metal which is curled backwardly upon itself at 56.

While the tool has been generally described in connection with the above discussion of its use, reference to the detailed illustration of the tool in Figs. 1 to 7, inclusive, will disclose preferred details of construction.

The jaws 40 of handle 39 are reenforced by welding to their inner faces plates 58, as best shown in Fig. 5 and Fig. 6. Each of these plates desirably comprises an inwardly turned flange at 59 arcuately formed, as shown at 60 in Fig. 6, to form an inward extension of the saddle formed by outwardly turned flanges 41, thus broadening the area of saddle contact with the rolled edge of the outer trough section.

The tucking jaws 54 are desirably made quite wide to extend for a substantial distance longitudinally of the eaves trough, this being done by twisting 90° the side flanges of the channel comprising handle lever 50. The twisted form of these jaws clearly appears in Figs. 2 and 6 and their width is best shown in Figs. 3 and 5.

The piercing tool 47, carried by handle 45, is desirably asymmetrically beveled, its point being located at one side thereof, as shown in Figs. 1 and 3. Another feature of the piercing tool consists in the fact that its lower surface is desirably channeled at 62, as best shown in Figs. 1 and 7. The slot pierced in the lapping trough sections tends to equal in depth the overall thickness of the piercing tool at its side flanges 63, leaving clearance within the slot 62 for the entry and guidance of the tongue 33 of the clamping strap. Fig. 9 shows the piercing tool in position in the trough and the tongue 33 disposed in a position to follow channel 62 when the strap is deformed by the chisel edged tucking jaws 54.

We claim:

1. A tool for applying a tongued eaves trough clamp to lapping eaves trough sections having rolled edges, said tool comprising a first handle bifurcated and provided with laterally spaced jaws, said jaws constituting a saddle applicable to the rolled trough edges, a second handle having a piercing tool disposed between the jaws first mentioned and pivoted thereto, said tool being curved to extend about the rolled edges of the trough sections and comprising means for piercing the sections immediately beneath said edges upon movement of the second handle in one direction, and a third handle bifurcated and provided with a pair of jaws pivoted to the jaws first mentioned adjacent the first handle, the last mentioned jaws being opposed to the saddle jaws and comprising means to form said clamp upwardly, beneath said rolled edges and force said tongue through the opening pierced by said piercing tool.

2. The tool of claim 1 in which the second handle is provided with a tongue-deforming tool at the opposite side of the pivot from said piercing tool and operable upon its pivot in an opposite direction of movement of the second handle to deform a tongue forced through said pierced trough sections by the jaws on the third handle.

3. The tool of claim 1 in which said piercing tool is channel shaped in cross section to receive said tongue in said channel in the course of its passage through the pierced opening in said trough section notwithstanding the presence of said piercing tool in said opening.

References Cited in the file of this patent

UNITED STATES PATENTS

| | | |
|---|---|---|
| 1,306,920 | Miller | June 17, 1919 |
| 1,355,465 | Gibbons | Oct. 12, 1920 |
| 1,570,708 | Roush | Jan. 26, 1926 |
| 1,624,556 | Marshall | Apr. 12, 1927 |
| 1,911,036 | Phenix | May 23, 1933 |